United States Patent [19]

Sawyer

[11] 4,369,100
[45] Jan. 18, 1983

[54] METHOD FOR ENHANCING CHEMICAL REACTIONS

[76] Inventor: Harold T. Sawyer, 845 Via de la Paz, Los Angeles, Calif. 90272

[21] Appl. No.: 285,952

[22] Filed: Jul. 23, 1981

Related U.S. Application Data

[60] Division of Ser. No. 837,041, Sep. 27, 1977, Pat. No. 4,168,295, and a continuation of Ser. No. 144,317, Apr. 28, 1980, abandoned, which is a continuation-in-part of Ser. No. 9,282, Feb. 2, 1979, abandoned, said Ser. No. 837,041, is a continuation-in-part of Ser. No. 633,818, Nov. 20, 1975, abandoned.

[51] Int. Cl.³ .............................................. B01D 19/10
[52] U.S. Cl. ......................... 204/157.1 S; 204/158 S; 423/659
[58] Field of Search ................... 423/27, 659; 204/157.1 S, 158 S, 193; 261/DIG. 48

[56] References Cited

U.S. PATENT DOCUMENTS

| 2,742,408 | 4/1956 | LaPorte | 204/157.1 S |
| 2,876,083 | 3/1959 | Prietl | 204/157.1 S X |
| 3,346,472 | 10/1967 | Long | 204/157.1 S |

FOREIGN PATENT DOCUMENTS 458872 12/1936 United Kingdom ......... 204/157.1 S

OTHER PUBLICATIONS

Crawford, A. E., *Ultrasonic Eng.*, Academic Press, NY, 1955, pp. 202–213.

*Primary Examiner*—G. Peters
*Attorney, Agent, or Firm*—Vernon D. Beehler

[57] ABSTRACT

A method for enhancing chemical reactions in a constantly flowing stream of liquid character fortified with oxidizing agents, such as air or oxygen or other chemical agents, makes use of an inner resonant tube concentrically mounted within an outer resonant tube with the walls of the tubes spaced from each other forming an annular passageway for the flow of liquid from one end of the passageway to the other. One or more sets of radially spaced ultrasonic transducers are located on the outside wall of the outer resonant tube thereby to create an ultrasonic cavitation condition in the liquid as it flows through the annular passageway.

9 Claims, 14 Drawing Figures

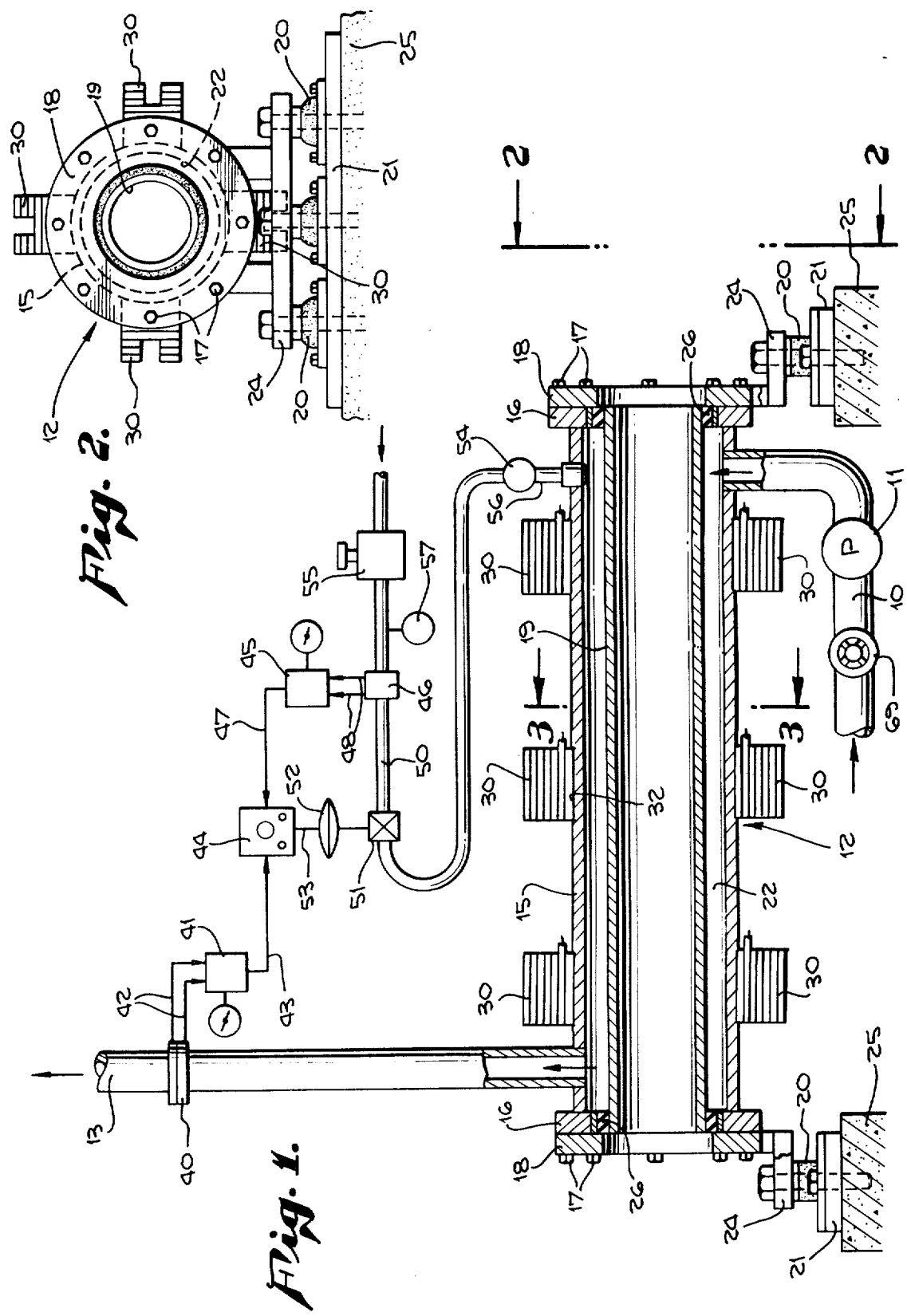

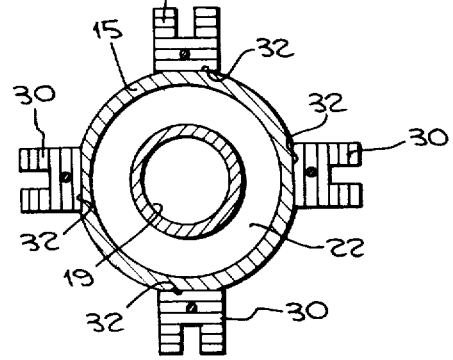
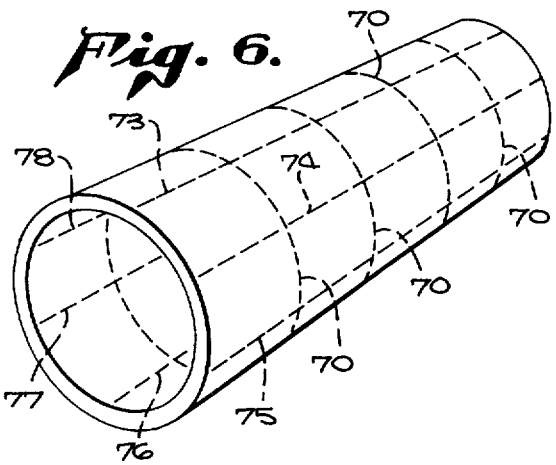
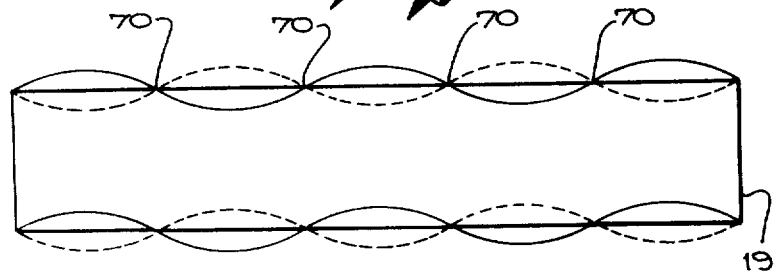
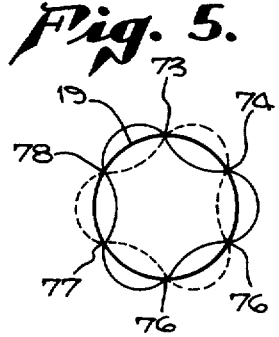
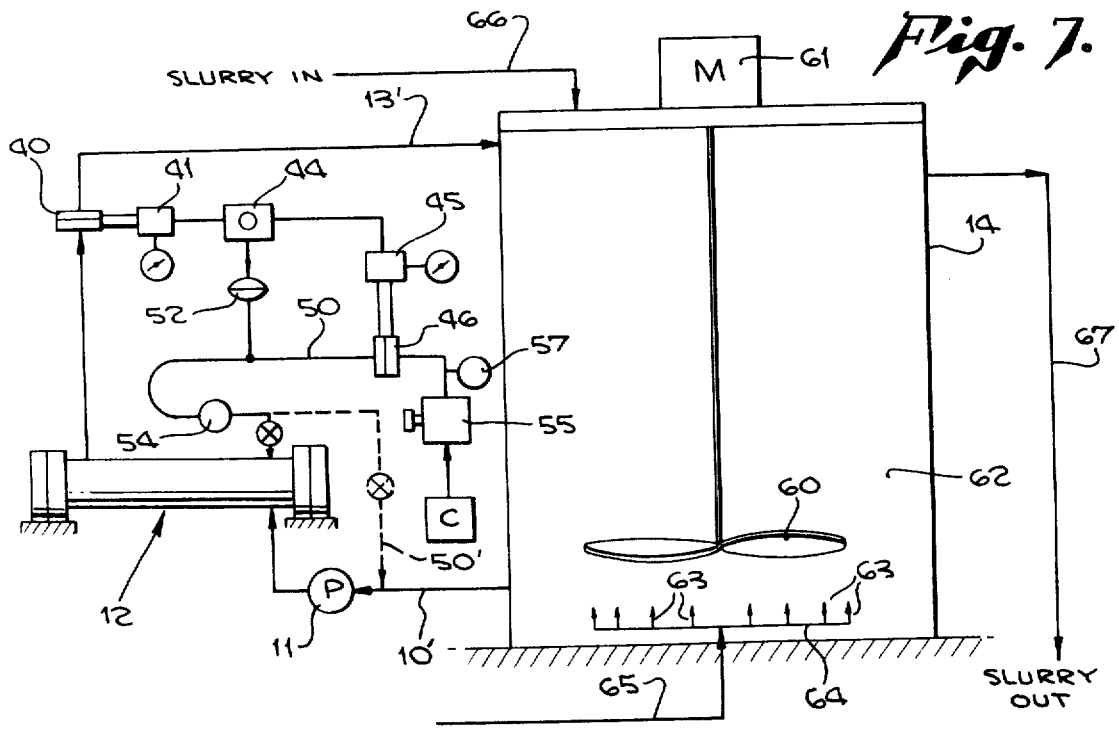

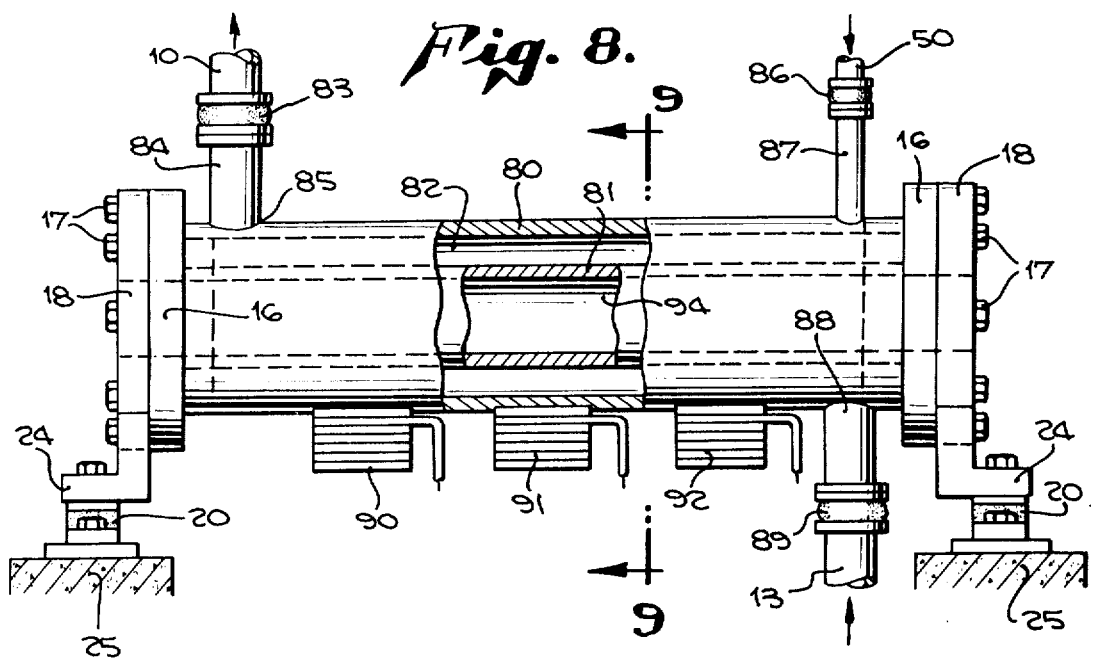
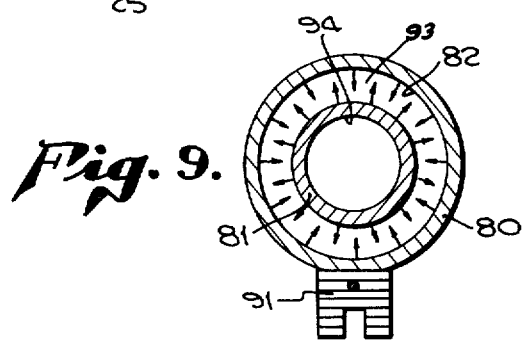
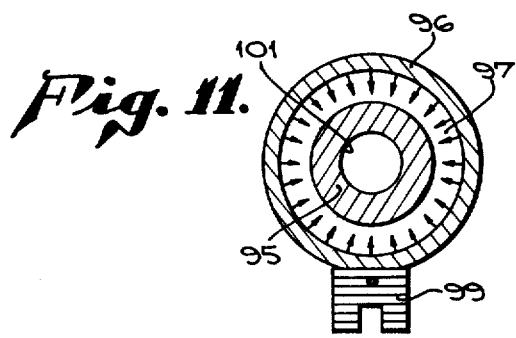
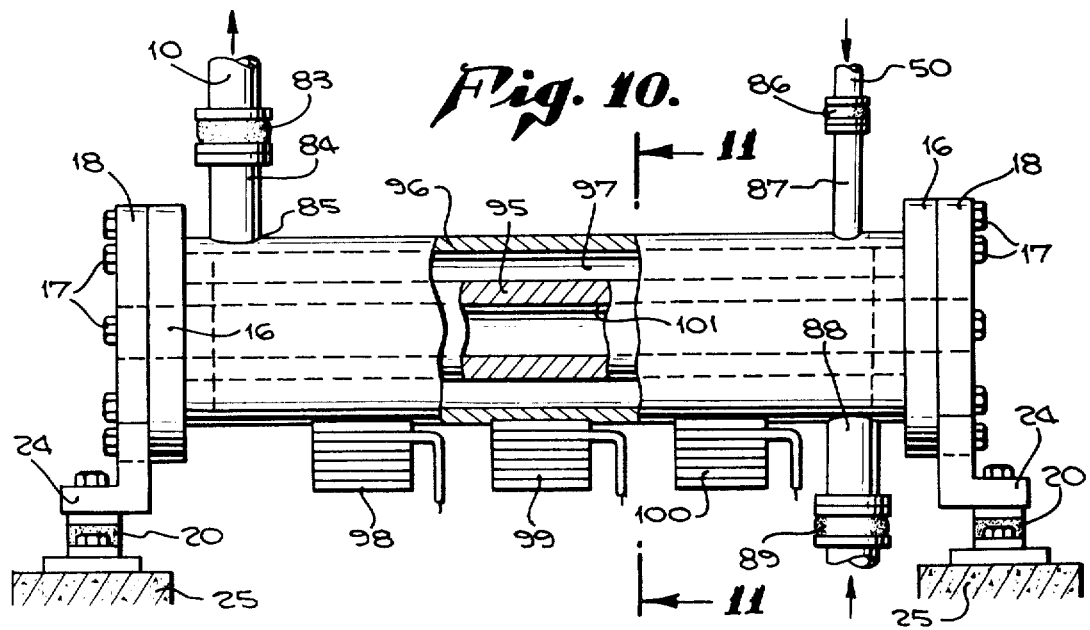

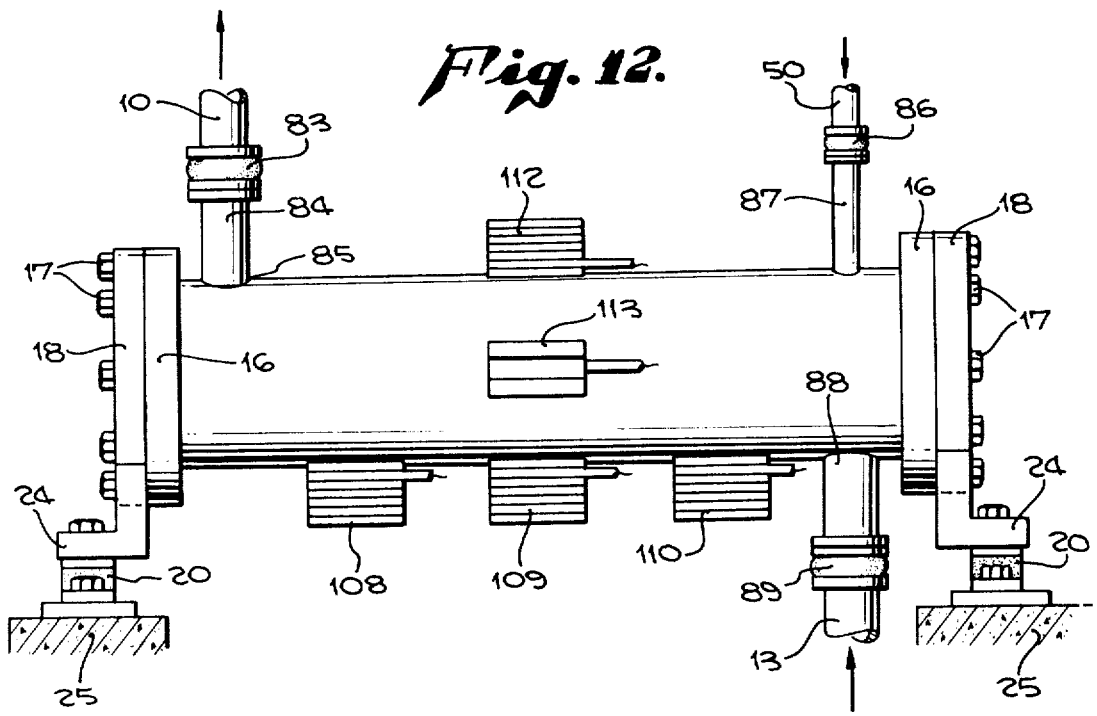
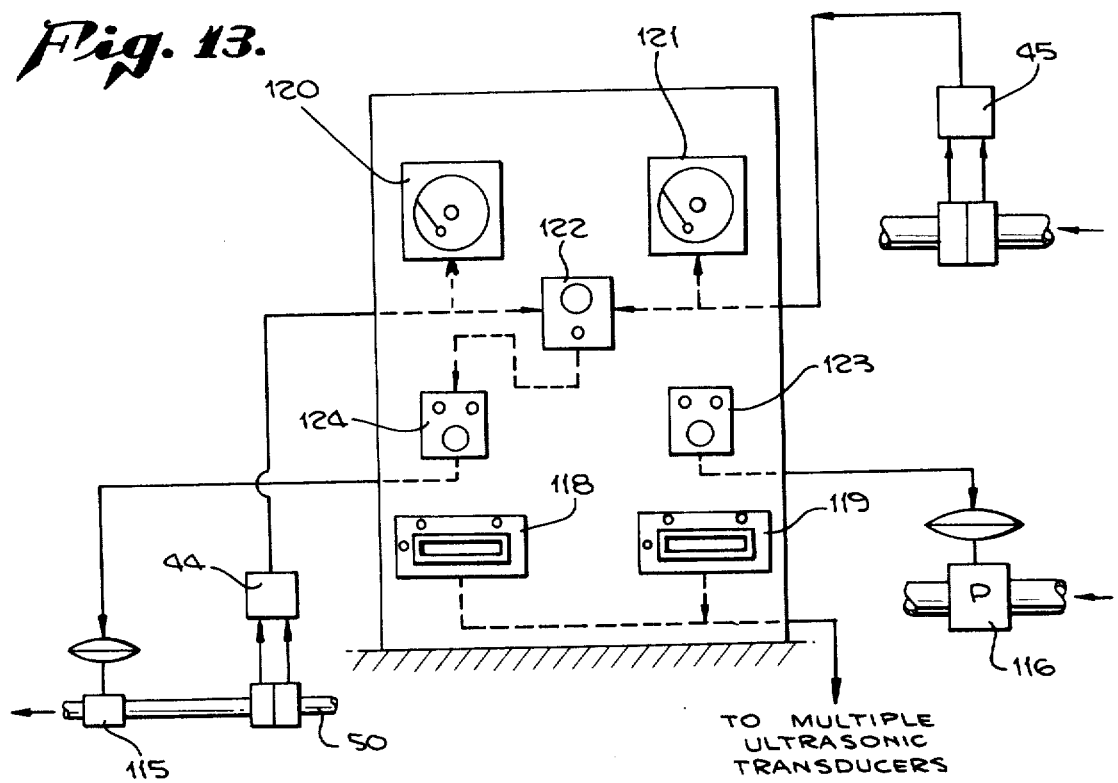

METHOD FOR ENHANCING CHEMICAL REACTIONS

This is a division of application Ser. No. 837,041, filed Sept. 27, 1977, now U.S. Pat. No. 4,168,295, which is a continuation-in-part of application Ser. No. 633,818, filed Nov. 20, 1975, now abandoned. This is further a continuation of Ser. No. 144,317 filed Apr. 28, 1980, now abandoned, which is a continuation-in-part of Ser. No. 9,282, filed Feb. 2, 1979, now abandoned.

Although ultrasonic cavitation of liquids has been resorted to in the past, as for example cleaning of metal objects, an also for processing purposes as evidenced by U.S. Pat. No. 3,464,672, the objective has been to transmit sound energy directly to the liquid. In U.S. Pat. No. 3,464,672 material such as rubber normally used as sound insulation pads because of having virtually no modulus of elasticity, has been used in tubular form as a support for transducers. Because of its sound deadening property, the rubber tube is incapable of resonance in the ultrasonic range and merely holds the transducers in a position such that they can drive the sound energy through the rubber wall to the liquid. Since no ultrasonic resonance can be set up in the rubber wall, no ultrasonic energy will pass to the liquid except directly at the locations of the transducers, which must be placed virtually edge to edge in order to get maximum application of energy to the liquid.

In general, techniques and equipment used, for example, in the processing and recovery of such metals as gold, uranium, silver and copper have been improved through better utilization of instruments and controls. Over the years there have obviously been improvements in process equipment and techniques used in the operation. The introduction of new technology, equipment and methods such as ultrasonic hydrometallurgical treatment of the slurry or pulp during the leaching operation, for example, has not been applied.

Improving the effectiveness of existing plant operations through the use of alternative process technology and the implementation of advances should lead to higher metal recovery and a reduction of metal lost to the tailing dumps.

In the case of gold recovery processing, for example, cyanide leaching is generally carried out in large tanks known as agitators or leaching tanks where the slurry or pulp having a consistency of between 30 and 50 percent solids in agitated generally by a combination of propellers and airlift injection to minimize diffusional limitations and to provide the oxygen or other oxidizing agents necessary for oxidation and resultant cyanide reaction.

Oxygen is recognized as an indispensable oxidizing agent in the dissolution of gold or other metals. Pure oxygen is generally too expensive to use. Therefore, atmospheric air is the customary source of the required oxygen gas used as an oxidizing agent. The degree of aeration of the cyanide pulp in gold processing is of significant importance and concern to the metallurgist since some ores, particularly silver ore, require more aeration than others. Agitation may be considered as stirring or mixing of the pulp with an excess of air in circular tanks of sufficient capacity to allow the balance of the gold to dissolve.

The economic incentive for higher recovery efficiency of metals during the leaching process is substantial and suggests improvement through better use of new technology. For example, it has been shown that a typical gold producing company with a recovery rate of 93 percent and with a sales of 50 million dollars annually could recover a significant amount of gold should the recovery efficiency be increased one percent to a value of 94 percent.

One of the current problems that occurs during the gold leaching process is to provide the proper rate of oxygen or air flow necessary for oxidation within the cyanide concentration to recover the maximum amount of gold from the ore. The atmospheric air which is introduced at the bottom of the agitator tanks causes an air lift in the form of bubbles which rise in part to the surface of the tanks. A portion of the agitation for mixing is provided by propeller mixing blades at the lower portion of the tanks.

There is commonly a strong resistance to the mixing of air or other oxidizing chemical agents with the cyanide solution during this stirring and airlift operation. The resistance is caused by the surface tension interface of the air bubbles and solution. As a result only a portion and an unpredictable amount of the air in the form of bubbles is dissolved in the cyanide pulp solution to provide for oxidation. Furthermore, there is no certain or known controllable means of determining an accurate air flow rate utilizing conventional equipment to provide the ultimate desired amount of oxidation and resultant reaction for maximum metal recovery.

Another problem relates to the time required for dissolution of metals in the agitation circuit. Although an important part of gold, for example, will dissolve in the grinding circuit if it is performed in a cyanide solution, there still remains significant undissolved values that require complete oxidation to more fully complete the dissolution. The total retention time required in the agitation circuit will usually range from 6 hours to 48 hours and sometimes somewhat longer on silver ores. Part of the problem therefore is the exceptionally long time required for processing and final dissolution in the agitator circuit.

It is therefore among the objects of the invention to provide a new and improved method for increasing the efficiency of reaction in such a chemical reactor where material passing through it is in the form of a slurry or pulp in a chemical solution.

Another object of the invention is to provide a new and improved cavitation system and method which effectively and efficiently reduces surface tension which impairs to a degree the desired reaction in the slurry while it is being subjected to oxidation.

Another object of the invention is to provide a new and improved method which is effective in improving reaction between substances in the slurry while the slurry is in transit, and without impairing in any way the rapidity of passage of the slurry from its source to an ultimate point of deposition.

Still another object of the invention is to provide a new and improved cavitation method of relatively simple and inexpensive character capable of being used as a part of the system for passing the slurry from its source to its point of deposition, the method being such that it tends to keep itself consistently clean, which operates at relatively high efficiency, which is capable of readily being serviced during the course of operation without need for a shut-down, and which significantly improves the efficiency of chemical reaction in the slurry.

Another object of the invention is to provide a new and improved method to complete more fully the dissolution and subsequent recovery of metals in a flowing stream.

With these and other objects in view, the invention consists of the construction, arrangement, and combination of the various parts of the device, whereby the objects contemplated are attained, as hereinafter set forth, pointed out in the appended claims and illustrated in the accompanying drawings.

FIG. 1 is a schematic view of the system adopted for practice of the method applied to a slurry while in transit, showing the device in section.

FIG. 2 is an end elevational view of the device taken on the line 2—2 of FIG. 1.

FIG. 3 is a cross-sectional view on the line 3—3 of FIG. 1.

FIG. 4 is a diagrammatic showing of the axial nodal pattern.

FIG. 5 is a diagrammatic representation of the circumferential nodal pattern.

FIG. 6 is a longitudinal sectional view showing the location of both circumferential and axial nodes.

FIG. 7 is a schematic representation of the system including an agitator tank.

FIG. 8 is a side elevational view partially broken away of another form of the invention.

FIG. 9 is a cross sectional view on the line 9—9 of FIG. 8.

FIG. 10 is a side elevational view partially broken away of another form of the invention.

FIG. 11 is a cross sectional view on the line 11—11 of FIG. 10.

FIG. 12 is a side elevational view of still another form of the invention.

FIG. 13 is a diagrammatic representation of the control panel and related instrumentation.

FIG. 14 is a schematic representation of a gravity system including a separator and solvent return system.

In an embodiment of the invention chosen for the purpose of illustration, there is shown in FIG. 1 a supply conduit 10 for a stream of substantially liquid material, such as a pulp or slurry, which is passed through the system by action of a variable speed pump 11 and evacuated through a discharge conduit 13. A chemical reactor assembly indicated generally by the reference character 12 receives the stream from the supply conduit and ultimately passes it to the discharge conduit 13. The discharge conduit may, on some occasions be directed to recirculating the slurry back to the process through appropriate conventional means or on occasions may pass the slurry to an agitator tank 14 as shown in FIGS. 7, from which it can be recirculated back to the supply conduit 10.

The chemical reactor assembly 12 consists of an outer resonant tube 15 having flanges 16 at respective opposite ends bolted in sealed condition by means of bolts 17 to respective flanges 18 supporting in part an inner resonant tube 19.

For a tube like the tube 19 to be resonant it should be of resilient stiff material with a modulus of elasticity in the range of from about 30,000,000 to about 21,500,000 or slightly lower. This is recognizably the range for metallic materials such as steel, stainless steel, nickel, alloys of copper and perhaps some of the harder alloys of aluminium with the possible inclusion of some specially constituted non-metallic materials. The stability inherent in the metallic materials is a highly desireable characteristic. Materials such as soft rubber or fiber reinforced rubber, or comparable pliable synthetic materials of which various hoses have been made and even phenolics with a modulus of 500,000 are clearly outside the required range and could not resonate in the ultrasonic range.

The outer flanges 18 have feet 24, which rest on resilient isolation supports 20. These in turn are carried on a pad 21 on a stationary bed 25 thereby to mount the chemical reactor in position.

As shown, the inner resonant tube has an outside diameter substantially smaller than the inside diameter of the outer resonant tube providing an annular passageway 22 therebetween. As shown, it is the passageway 22 which the supply conduit 10 is directed into and from which the discharge conduit 13 flows.

An annular isolation ring 26 at each end serves to isolate and seal the inner resonant tube from the outer resonant tube 15 and to permit the tubes to be isolated in resonance.

In designating the ring 26 as an isolation ring consideration must be given to the intensity and wave length of the ultrasonic character of the device. The isolation material should normally be much denser than that acceptable to sonic energy in the audible range and may, on occasions, be omitted entirely.

Mounted on the exterior of the outer resonant tube 15 are three sets of ultrasonic magnetostrictive transducers 30. In the chosen embodiment there are four such transducers in each set and all are mounted at an appropriate wave length antinodal point. In practice one or more transducers may be used depending on the power requirement of the system or a multiple number as shown. The ultrasonic heavy duty magnetostrictive transducers 30 are substantially conventional in their mechanical makeup, and adapted to be supplied with electric current from their power supply generator and through appropriate leads 31.

Piezoelectric transducers are customarily made with a resonant diaphragm at which point the high frequency sound energy is accummulated and from which the sound wave energy is projected. In the device herein disclosed the resonant tube is itself a diaphragm for the magnetostrictive transducers and irrespective of whether one or a multiple number of transducers are employed the entire tube is set in resonance at the same ultrasonic frequency. The transducers and the entire length and circumference being in that way activated produces a source of sound wave energy applied completely throughout the entire surface of contact of the liquid with the resonant tube. A high power transfer of sound energy is in that way made possible.

In the present disclosure, the structure itself, namely the entire length and circumference of the resonant tube or tubes, as the case may be, provides a diaphragm for sound emission in the ultrasonic range which generates the desired cavitation in liquid flowing adjacent to it. By providing dual resonant tubes the liquid passage 22 is kept narrow and substantially all liquid passes in contact with the resonant tube exposed surfaces. When both tubes are set in resonance by transducer action, cavitation is produced over an area encompassing the entire length and circumference of the liquid media to be treated.

For greater convenience the transducers are shown mounted on the exterior of the outer tube. For generating resonance directly in the inner tube the transducers could be mounted on the interior of the inner tube. The inner surface of outer resonant tube 15 and the outer surface of inner resonant tube 19 are plasma sprayed for corrosion and abrasion resistance.

To integrate the transducers with the wall of the resonant tube, and employ the tube as the transducer diaphragm, the transducers are vacuum brazed directly to the resonant tube. Flats 32 may be milled on the surface of the tube itself at the transducer locations where the brazing is to take place.

In the system as shown in FIG. 1 an orifice flange 40 is provided in the discharge conduit 13 which is serviced by a flow tansmitter-indicator 41 through leads 42. From the flow transmitter a lead 43 leads to a flow ratio controller 44. The same flow ratio controller also services a second flow transmitter-indicator 45 and orifice flange 46 through leads 47 and 48. As noted, the orifice flange 46 is in a line 50 for the introduction of oxygen or other appropriate oxidizing agent to the system. In the line 50 is an automatic control valve 51, the operation of which is dependent upon operation of the flow ratio controller 44 acting on a diaphragm valve actuator 52 through appropriate connection 53.

A pressure reducing control valve 55 and companion pressure gauge 57 are located in the line 50 upstream with respect to the orifice flange 46. At the downstream discharge end of the line 50 and located within the annular passageway 22 is an aspirator nozzle 56. A check flow valve 54 is shown near the discharge of line 50. Oxygen or other appropriate chemical oxidizing agent flows from the line 50 through the slurry within the annular passageway 22. The slurry is forced through the annular passageway 22 by means of the pump 11 which is located at the inlet end of the annular passageway. A manual valve 69 may be mounted in the supply conduit 10 as shown.

FIG. 7 represents a recirculation system added to the disclosure of FIG. 1 and shows the chemical reactor 12 and its associated equipment interconnected to, for example, commercial type of propeller agitator or leaching tank 14 for continuous recirculation of the contents of the agitator tank for processing by the chemical reactor 12.

A process inflow line 66 passes pump or slurry to the tank reservoir chamber 62, and an outflow line 67 returns the processed material to the main process system circuit. A propeller 60 within the tank driven by motor 61 provides stirring, lift and agitation for the tank's contents. In addition, the tank is provided with a series of air jets 63 located on a spreader 64 at the bottom of the tank and supplied by an auxiliary air line 65. The purpose of the jets is to provide oxidation of the tank's material and to also induce an additional air lift for agitation.

The recirculation is provided by a conduit 10' located near the bottom of the tank and a conduit 13' located near the top portion of the tank. The pump 11 passes the material through the chemical reactor and returns the contents to the agitator tank through conduit 13'.

To illustrate graphically the activity of the resonant tubes 15 and 19 there is shown in FIG. 4 a resonant pattern which contains four axial wave length nodal points 70. There are also circumferentially disposed wave length nodal points as shown advantageously in FIG. 5, namely, the nodal points 73, 74, 75, 76, 77, and 78.

The chemical reactor as shown in the drawings is a device to provide a controlled rate of oxidation and reaction of the pulp and cyanide solution and in proportion to the pulp flow rate, and also subject the pulp mixture solution passing through the reactor chamber to intense dispersion, mixing, cleaning, and to a chemical reaction within the confined annular passageway 22. In the passageway the mixture is processed under precisely controlled conditions by very intense ultrasonic energy which in turn produces a high energy field of cavitation energy directed in spherical and perpendicular fashion across and through the slurry solution within the annular passageway 22 as shown in FIG. 3 and as it flows through the reactor chamber.

Since the reactor is a self-contained device which can be designed to a wide range of flow rates, it lends itself to choice of locations in the cyanide leaching circuit. As desired by the metallurgist for example, an effective installation would be to utilize the chemical reactor as a recirculation device for one or more of the holding tanks, whereby flow capacities ranging from 40,000 gallons per hour or higher could be withdrawn continuously from a tank, circulated through the reactor for processing and returned to the agitator tank. In this manner, the contents of the tank would be recirculated and processed for controlled oxidation and reaction many times during processing. For larger tanks where larger rates of recirculation may be required, multiple use of the chemical reactors can be utilized.

FIG. 7 shows the conduit 10' flowing from the agitator tank 14 which transports the slurry and cyanide solution to the reactor, the flow rate of which is measured by either a segmental orifice or a flow nozzle and its transmitter. The pump 11 is shown in the line to circulate the pulp solution through the agitator assembly 12 to the tank 14. The compressed gas flow rate is measured in turn by the orifice 46 and its transmitter 45. The two flow transmitters 41 and 45 in turn transmit their individual flow rate results to the flow ratio controller 44 which automatically regulates control valve 51 in the compressed air line to proportion and maintain a fixed ratio of airflow to pulp solution flow. The flow ratio controller 44 is equipped with a manual ratio setting to enable the metallurgist to adjust the desired value or ratio from time to time as may be required to maintain optimum oxidation and reaction taking place in the agitator holding tank closed system in order to increase the efficiency of metal recovery. The compressed air may be passed to the reactor assembly 12 through a shutoff valve 59 shown in solid lines or through a line 50' and shutoff valve 59' to a point upstream of the pump 11 as shown by broken lines.

The resonant tube 15, which is a cylindrical shell, is specifically designed to one of the desired axial and circumferential ultrasonic resonant frequencies that have been selected for the structure. An example of the wave length frequency patterns showing nodes and antinodes referred to for the cylindrical shell is illustrated in FIGS. 4, 5 and 6. The same description applies also to the tube 19.

Employment of the chemical reactor in ore and metal chemical processing dictates that the cylindrical shell be designed for the ultrasonic frequency range chosen preferably at a value between 20,000 and 40,000 cycles per second. The cavitation implosions therefore in microns would permit the cavitation energy to penetrate, attack annd implode the ore surfaces, pores, fissures, and grain boundries and to also implode the molecules of the metals themselves. Ultrasonic heavy duty industrial magnetostrictive transducers are commercially available to supply the ultrasonic frequencies required for installation on the resonant tubes.

Modern ultrasonic magnetostrictive transducers are furnished commercially with solid state power supplies that are provided with adjustable output power and adjustable frequency. These features are ideally suited for application to the chemical reactor, and also offer engineered reliability represented by 10 year guarantees.

With reference to FIG. 1, the pulp solution containing atmospheric air as an oxidizing agent enters the ultrasonic chamber, namely, the passageway 22, for processing where it is exposed to an intense field of cavitation where the energy thus released within the pulp and solution causes the interfaces and surface tensions of the materials to be broken and also to provide an energy means for oxidizing a good portion of the oxygen into reaction. In addition, the high energy kinetic reaction that takes place within the pulp solution causes dispersion, agitation, mixing and surface cleaning of the materials and intense implosion on the surfaces of the exposed metal to more fully release the metallic molecules into solution.

The combined resonant system consists of the resonant cylindrical tubes 15 and 19, one or more transducers, or a multiple number of transducers, and its ultrasonic generator power supply. The resonant cylindrical tubes are excited sinusoidally into one of their wave length modes of natural frequency in the ultrasonic range at a chosen value between 20,000 and 50,000 cycles per second.

The longitudinal and circumferential elastic wave energy at resonance and thus released from the cylindrical tube, causes very intense acoustic compressional sinusoidal wave energy to be transmitted in perpendicular fashion from the outer resonant tube surface through the pulp solution or slurry as shown in FIG. 3. The speed of the transmitted compressional wave energy within the unpure pulp solution is estimated at 5500 feet per second. The shearing forces of the compression wave energy traveling through the pulp solution cause a very high degree of kinetic energy reaction to take place within the pulp mixture which in turn fractures and ruptures the solution into a known form of energy namely vaporous cavitation which is a commonly accepted term for such a condition.

The vaporous cavitation energy field within the solution is continuously subjected to alternating positive and negative pressure cycles which cause microscropic bubbles to be formed during the pressure cycles and to be collapsed during the negative cycles thus causing a very intense vacuuming or implosion action on all the surfaces of materials in solution, for oxidation and implosion of ore surfaces and crevices which contain molecules of metal.

Such energy life cycle transformations in three force planes take place each $10^{-9}$ of a second and form ellipsoid energy patterns in three planes which are continuously in a state of formation and collapse. It is during the negative pressure or collapse phase of the energy cycle that voids are produced, as are also vapor cavities in solution. This in turn produces very intense vacuuming action on the surfaces and crevices of the ore material in solution, sometimes referred to as an implosion effect. The implosions which take place on the surfaces of the ore even to minute surface diameters of a few microns cause the surface tensions to be broken and permit the chemical solution to produce additional dissolution of the metal by penetration into the ore crevices and to also provide for a higher degree of oxidation to take place.

Basically, there are four mechanisms involved in removing additional metal from ore while undergoing processing in a chemical reactor: (1) solvation, (2) interface exchange, (3) chemical reaction, and (4) dissolution.

In the case of gold recovery, for example, a cyanide solution serves as a chemical solvent agent for dissolving the gold from the ore. Any mechanical agitation speeds up the solvation process. The forces of cavitation will provide a direct and effective mechanical agitation.

Cavitation can also serve to break down the molecular force or interface that exists between the solution and the ore particles containing gold. The breaking of these forces can be accomplished by the direct shock or impact imparted by acoustical vaporous cavitation or can be the result of a fatiguing action caused by repeated bombardment and resulting explosions. Once the molecular attraction of the solution to the ore and metal is broken, the surface metal is imploded and cleaned and thus exposed for further dissolution.

Chemical mechanisms can also be in the form of chemical conversions or of the addition of chemical energy to the dissolution process. Among the latter the addition of air or other chemical oxidation agents are most widely used. Cavitation serves to accelerate this energy reaction. When the mechanism is a chemical conversion, the usual action is to convert the metal to a soluable form.

Cavitation aids also in these reactions by means of the great pressure differentials that are set up by the implosions in the microscopic pores, cracks and grain boundries of the ore and metal and by the heat dissipated at the moment of implosion. The cavities or voids left by these implosions are instantaneously filled with the chemical fluid solution that surrounds the ore particles and are driven by very high transitory pressures. The resulting pressures generated at the loci of these implosions have been measured up to 1000 atmospheres. Furthermore the heat dissipated at the moment of implosion has been determined to be in excess of 1000 degrees centigrade. Chemical processes can also be aided in a vaporous cavitation field by the direct mechanical agitation of cavitation, since they maintain a maximum concentration gradient of the chemical solution at the surfaces of the ore particles.

One unique feature of cavitation is that it can be generated anywhere that a compressional sound wave of sufficient intensity can penetrate, and reaction will occur deep within the interstices of an ore particle with complicated geometric configuration. Ore particle surfaces which are seemingly smooth to the naked eye have microscopic pores, crevices, cracks and grain boundries. The specific action of cavitation penetrates these minute areas with very intense transitory energy and results in implosions and resultant ruptures and fissures of the ore material at the microscopic level which can be equaled by no other known method. The implosions occurring on and within the ore particles create tremendous transitory pressures within the material. The alternative vacuum and pressure energy action reaching 1000 atmospheres of pressure occur many thousands of times per second and at resonance, which causes fatigue within the pores, cracks, grain boundaries and fissures of the ore particles which forces the ore particles to be fractured to a large extent and thus to expose more fully the molecules and surfaces of metal for further recovery by means of chemical reaction and dissolution.

The solid state ultrasonic system is an efficient means to provide the energy necessary for operation of the chemical reactor. The individual power requirements, for example, for multiple transducer units is relatively low and may be supplied commercially as desired in power increments up to 12,000 watts. In special cases where very high capacities are required for a single chemical reactor, a multitude of transducers 30 representing a multiple system may be used as shown in FIG. 1. In this case the multiple transducers would be driven in phase from a single power source. An alternate installation for higher rates of circulation could be made by utilizing multiple chemical reactors.

In the form of invention of FIGS. 8 and 9 there are provided dual resonant tubes 80 and 81 the outer tube 80 being of substantially the same thickness and resonant character as the inner tube 81 which is spaced therefrom providing an annular passageway 82.

The tubes 80 and 81 are isolated from each other by the same structure described in connection with FIG. 1 and are carried by appropriate supports 20 in the same fashion.

Because of the resonant character of the outer tube 80 there is provided at the end of the supply conduit 10 a flexible isolation joint 83 of an appropriate vibration damping material through which the fluid flows to a stub conduit 84, directly connected to the outer resonant tube 80 by a rigid weldment 85. A similar flexible isolation joint 86 at the end of the line 50 carrying the oxydizing agent connects to a stub 87 by which the agent is conducted into the passageway 82 through the wall of the outer resonant tube 80.

Similarly also a discharge stub 88 connects to the discharge conduit 13 through an isolating joint 89.

The joints as described taken together with the mountings at the end of the resonant tube assembly isolate the entire reactor structure from any rigid attachment or connection which would otherwise impair the effectiveness of the ultrasonic wave action which is generated.

By way of example there are shown three transducers 90, 91, and 92, on this occasion all connected to the exterior of the outer resonant tube 80. The transducers are axially spaced one from another in such fashion that they apply their force to the outer resonant tube 80 at wave length antinodal points.

As indicated in FIG. 9 ultrasonic energy set up in the outer resonant tube 80 is transmitted by fluid material 93 to the inner resonant tube 81 causing the inner resonant tube to be excited at resonance thereby to set up a resonant wave pattern in the fluid material in an opposite direction also as indicated by the arrows in FIG. 9.

A chamber 94 through the inner tube is clear.

The embodiment of FIGS. 10 and 11 differs in that an inner tube 95 is thick walled and stationary whereas an outer tube 96 is relatively thinner walled and resonant. The tubes are concentric and radially spaced from one another providing an annular passageway 97 for the fluid material which is subject to the reaction. Here again transducers 98, 99, and 100 are mounted on the exterior of the outer tube 96 at respective wave length antinodal points to generate an ultrasonic frequency resonant wave condition such as that illustrated by the arrows of FIG. 11. In the device of FIGS. 10 and 11 there is an open chamber 101 extending through the inner tube 95.

An augmented transducer pattern is illustrated in FIG. 12 where, by way of example, an inner tube 105 and an outer tube 106 are illustrated as resonant tubes comparable to the arrangement of FIGS. 8 and 9. The tubes 105 and 106 following the arrangement of the other forms of the device provide an annular passageway 107 for the fluid material which is to be reacted, there being a clear chamber 108 through the inner tube 105.

For this arrangement transducers 108, 109, and 110 are applied to the exterior of the outer tube 106 at longitudinally spaced intervals so that they are located at antinodal points for the vibration condition which is set up. On this occasion additional transducers 112, and 113 extend circumferentially around the outer tube 106 at the longitudinal midline.

With the proposed arrangement ultrasonic vibrations of two different kinds are generated in the outer resonant tube 106 thereby emphasizing the pattern of both radial and longitudinal wave action, the elements of which have already been described in connection with FIGS. 4 and 5. It should be observed further that the circumferentially disposed transducers should also be applied at antinodal points. Moreover additional circumferentially disposed transducers are contemplated at other antinodal points corresponding for example to the locations of transducers 108 and 110.

Further still, although for the embodiment of FIG. 12 several resonant tubes are shown, it may be found preferable to provide only one resonant tube as for example making the inner tube 105 thicker walled and stationary. Further still by following the pattern of mounting of FIGS. 1 and 2, transducers of appropriate size and capacity can be mounted not only at axially spaced locations but also at circumferentially spaced locations around the inner circumference of the inner tube, where that tube is made a resonant tube.

Since the resonant character of the tube in which the transducers are mounted is appreciably significant, as well as the location of the transducers at wave length antinodal points a typical installation can be calculated.

Assuming the resonant tube to be of steel, the speed of sound in the tube can be assume to be 14,610 feet per second. The frequency imparted to ordinary steel by the transducer may be designed for 22,000 cycles per second. Therefore in the equation:

$$14,610/22,000 = 0.6641 \text{ feet}$$

8 inches = 0.6666 feet. As a consequence, the transducers, where more than one are mounted on the resonant tube, will need to be at intervals of which would be multiples of approximately 8 inches. Because of known properties of the materials and related standard mathematical constants the entire structure can be designed to have the resonant characteristics desired.

The control panel of FIG. 13 is illustrative only and shows a control for, for example, the flow ratio controller or selector valve 44, the flow transmitter 41 for the oxidizing agent, a proportioning control valve 115 and a fluid flow measuring device 116.

Ultrasonic power supply generators are indicated on the panel by reference characters 118 and 119. Flow recording meters are indicated by the characters 120 and 121 and flow ratio controller by the reference character 122. A remote manual selector valve for control of the total flow leaving the reactor is shown at 123 and a manual automatic flow ratio selector valve at 124. Because of the nature of the apparatus and process made possible by the arrangement of equipment shown, careful control and regulation is a requisite and for adequate effectiveness all controls and indicators need to be concentrated at a single location.

Although the application of the chemical reactor for the mine processing industry has been detailed in this disclosure, there are other significant uses for the chemical reactor in the chemical processing industry generally where such methods and technology may be utilized in other forms of processing namely, dispersion, cleaning, chemical washing, mechanical agitation, mixing and completion of chemical reactions by the introduction of various forms of oxidizing agents in a controlled manner.

An example of a system capable of accommodating, for example, a method or process directed to solvent extraction of oil from tar sands or oil sands is shown in a pilot extraction plant system as illustrated in FIG. 14. As there shown, the system is one set up for operation principally as a gravity system in the interest of economizing further power requirements.

An acceptable apparatus as shown would involve several processing steps. The first step in the process is the reduction of the oil sand agglomerate. Deagglomeration to a maximum one-quarter inch size is sufficient, since the high frequency energy action quickly reduces the tar sand to individual granules. The tar sands would be processed continuously by a single-toothed crusher since the material is easily reduced. The tar sands thus supplied by the mass 130 are continuously fed to a hopper 132.

The material is then funnelled into an automatic continuous weighing gravimetric feeder 133 and weighed in terms of LBS/HR and from there into a mixing tank 134 which has an impeller agitator 135. In this instance solvent 136 from a solvent tank 137 is fed by gravity to the mixing tank 134. The flow is metered by a meter 138 in terms of LBS/HR in a solvent line 139. The flow through a line 140 is manually set to a metered amount on a weight basis by means of a manual valve 143 so that the solvent flow weight to the mixing tank 134 and the tar sand flow weight to the tank 134 are at a ratio of one to one, or less, by weight. A heater 144 in the solvent tank 137 maintains a low temperature of 23° C. A float control mechanism in tank 134 will automatically close a normally open valve 142 by means of a pneumatic line 141 when the tank level of 134 exceeds its desired level for safety purposes. A solvent 136 suitable for the process is No. 2 oil.

From the tank 134 the slurry mixture flows continuously through a discharge line 146 in which there is a hand-operated valve 147 and a metering device 148 to the upper end of a chemical reactor assembly 150 of the type heretofore made reference to.

A by-pass line 170 is provided to pass a small amount of fresh solvent 136 as a chemical reagent to the chemical reactor assembly and is metered by a meter 171 through a valve 172. This relatively small by-pass chemical reagent flow provides a process corrective means to produce highest extraction efficiency within the chemical reactor.

The mixing tank 134 also serves a significant function as a detention device since the tank volume is designed to be many times the annular processing chamber volume of the chemical reactor. A flow detention time of 15 to 30 minutes has been found sufficient to soften the tar or the crushed tar sand before final extraction takes place in the chemical reactor 150.

The pre-mixed slurry enters the annular high frequency energy chamber of the chemical reactor 150 where cavitation quickly reduces the tar sand by implosions to individual grains. As the action continues, cavitation also blends the solvent with the bitumen and the energy implosions separate it from the sand. The unique advantage of using sonic energy is that it acts on each individual grain of sand. Cavitation, the minute vacuous bubbles that constantly form and collapse, causes an intense energy release that implodes the material, causing the softened bitumen to be pulled away from the hard surface of the sand much the same as it pulls soil or contamination away from hard surfaces in cleaning operations. In this instance, however, the purpose is not to clean the sand, but to remove the bitumen.

The next step in the process is to pass the slurry mixture of bitumen, sand and solvent by gravity flow through a line 153 to a clarifier 154.

The clarifier provides a standard means for liquid-solids separation. The solid in this case is sand and the liquid represents the oil-solvent solution. Water within the clarifier acts as a separation medium since the specific gravity of the oil-solvent is considerably lower than water. The oil-solvent mixture rises to the top of the water solution and is skimmed off the top through a line 160 for further processing. The clarifier mechanism also provides a high rate of circulation and agitation which causes further dissolution of the bitumen in the solvent solution. The clean and slowly falls to the bottom of the clarifier and is removed through a line 156 by a screw auger. A slight amount of detergent added to the water solution will enhance the removal of solvent from the sand surfaces.

Waste water from the clarifier is removed through a line 157 and processed in a water filtration unit 158, clean water being removed through a line 159 and returned to the clarifier. Make-up water is supplied to the clarifier by means of line 152 in order to maintain a constant water level in the clarifier 154.

The next step in the process is to pass the oil-solvent solution to a fractionating tower 163 by means of a line 160 and pump 162 as metered by a meter 161. The solvent is taken off, decanted and returned to the solvent tank 137 by means of a line 165 for further use. The oil at approximately 18° API is removed through a line 164 and subjected to the usual processes, such as cracking, reforming and alkylation, to produce motor fuel, fuel oil and similar products. Solvent loss experimentally is less than 1%. Oil extraction from tar sands has been shown experimentally to be 96% to 98%.

The continuous flow solvent extraction process, as shown in the schematic pilot plant illustrated in FIG. 14, may be implemented to a large oil extraction production plant of 10,000 Bbls/day to 20,000 Bbls/day or higher and within the framework of sound engineering practice.

This, for example, may be accomplished by enlarging the outside diameter of the chemical reactor 150 to six feet or larger whereby the annular processing chamber is designed to desired volumetric considerations while at the same time maintaining the proper and most efficient energy transmission distance within the annular chamber for efficient extraction purposes.

Individual high capacity chemical reactor units may be added in the form of modules to obtain any total desired plant capacity. These modules would operate in a parallel configuration and be supplied by one or several slurry feeders.

For a better understanding of application of the method to industrial processes reference is made to the following examples.

(1) For a typical uranium extraction plant the extraction, or chemical separation, of uranium from ore is accomplished in a two-stage leaching circuit consisting of a 4.5 hour leach at 65 psi pressure and 200° F. followed by an 18 hour leach at atmospheric pressure at a temperature of 180° F. Leaching is accomplished in an aerated solution containing substantially 37 grams of $Na_2CO_3$ per liter and substantially 7 grams of $NaHCO_3$ per liter. The extraction obtained from pressure leaching varies from 85 percent to 95 percent depending upon the type or grade of ore. The atmospheric portion of the leach represents that portion of the process where the method of enhancing chemical activity is used as shown in FIG. 7 to enhance the oxidation of slurry material. The atmospheric portion increases the chemical extraction or separation from substantially seven to ten percent for ores that produce a pressure leach separation of only 85 percent. The grade of ore average in a typical plant is 0.21 percent $U_3O_8$ and the leach for residue averages 0.011 percent $U_3O_8$.

The chemistry of the alkaline leeching system involves the oxidation of any tetravalent uranium to the hexavalent state using oxygen available in the air. In FIG. 7 of the drawings, the introduction of air to the reactor, as a chemical agent, serves as a means to enhance the rate of oxidation and the chemical separation under controlled means. The hexavalent uranium dissolves in the presence of carbonate alkalinity to form a uranyl tricarbonate complex ion according to the following reaction:

$$2UO_2 + O_2 + 6Na_2CO_3 + 2H_2O \rightarrow 2Na_4UO_2(CO_3)_3 + 4NaOH.$$

The uranium will not dissolve in a sodium carbonate solution because the hydroxide alkalinity formed with the complex ion causes the ion to decompose. In a solution containing sodium bi-carbonate the hydroxide alkalinity is utilized immediately. Such reaction proceeds as follows:

$$2UO_2 + O_2 + 6Na_2CO_3 + 4Na_2HCO_3 \rightarrow 2Na_4UO_2(CO_3)_3 + 4Na_2CO_3 + 2H_2O$$

In the foregoing example, the reactor enhances both chemical reaction and the chemical separation.

(2) Application of the reaction enhancement for gold processing is similar in a substantial degree to its use for uranium processing since a chemical reaction of the slurry material is obtained during the oxidation process and a chemical separation of the metal follows. Cyanidization is the most common process used in the chemical separation of gold from ores. The basis of the cyanide process is that weak solutions of an alkaline base cyanide have a preferential dissolving action on the small particles of the metallic gold over other materials usually found in the gold ores. Cyanide is the general descriptive term applied usually to sodium cyanide, NaCN, and the strength of the solution as well as basic formulae are in terms of that chemical. Either sodium or calcium cyanide is used in practice. The calcium cyanide is available in impure form analyzing close to 50 percent NaCN equivalent and sodium cyanide is available in various grades from 85 percent to 95 percent NaCN.

The equation generally accepted as expressing the reaction of gold in dilute cyanide solutions is as follows:

$$4Au + NaCN + O_2 + 2H_2O = 4NaAu(CN)_2 + 4NaOH.$$

Thus when fresh surfaces of gold are exposed to the action of cyanide in an aqueous solution containing free oxygen, a gold cyanide compound and a hydroxide (alkaline) will be formed.

Oxygen is essential for dissolution and is recognized as an indispensible factor in the dissolution of gold by cyanide solution. Pure oxygen being too expensive to use in a commercial operation for oxidizing the chemical solution, atmospheric oxygen is the customary source. Reference made to the practice of the method is made possible through the apparatus of FIG. 7 where air is introduced into the chemical reaction to oxidize the slurry solution under controlled means and to simultaneously cause a chemical separation of the gold particles and cause a dissolution of the gold particles. Aeration of the cyanide constituant also takes place in the atmospheric leaching tank as well as in the reactor much the same as in uranium processing. Strength of the solution is usually about one pound of cyanide (NaCN) to one ton of solution (water).

In this case, the method enhances chemical reaction and chemical separation.

(3) Application of the method of petroleum processing: A method for decreasing the sulfur content of crude oil in which sulfur is present in an elemental state or in chemical combinations with an organic substance contemplates circulating crude oil through the reaction in company with hydrogen ($H_2$). The hydrogen is introduced as a chemical agent into the method and mixed under a condition of high energy activation producing cavitation at relatively low temperature. The energy released within the liquid-gas mixture ruptures the carbon-sulfur bonds of the molecule and effectively forms hydrogen-sulfur bonds in the form of $H_2S$ after combining with the free hydrogen ($H_2$) in solution. Therefore the gaseous sulfur containing compounds are evolved from the liquid. The $H_2S$ gas is then separated into hydrogen ($H_2$) and sulfur (S) by conventional process means. The sulfur is therefor recovered and the hydrogen is returned to the reactor method for further processing.

In the foregoing example, the reaction method enhances chemical reaction and also chemical separation.

(4) Still another example is one involving the cleaning of coal in the coal process industry:

The cleaning of coal which has been reduced to a pulverized state presents a critical problem in the processing of such coal prior to shipment for combustion application. One of the concerns is to remove as much sulfur as possible for environmental reasons. Coal is commonly first cleaned with water. Sulfur, however, and certain pyrites remain in the pulverized coal material. The next step is to mix this pulverized coal with a solvent that will react chemically with the sulfur compounds. To enhance that chemical reaction and also to enhance the chemical separation of the sulfur, the mixture of pulverized coal and solvent forming a slurry or liquid-like mass is passed through the reactor method and processed under a high energy activation to enhance the release of sulfur compounds into the solvent.

Other chemical organic agents acting as catalysts may also be released into the reactor method to further enhance reaction and separation of sulfur.

An organic solvent is used and may be selected from a number of solvents of organic nature which are commercially available. In the case under consideration the reactor method enhances chemical reaction and chemical separation which takes place during the processing.

Having described the invention, what is claimed as new in support of Letters Patent is as follows:

1. A method for enhancing chemical activity in a continuous system comprising continuously circulating a predominately liquid mass through the system at a selected rate of flow, continuously introducing a chemical agent into the predominately liquid mass to form a predominately liquid composite mass, confining the flow of said composite mass to a stream of annular cross-sectional shape having an inflow at one end and an outflow at the other end, moving the composite mass in a freely flowing stream and at a substantially continuous rate from said inflow end to said outflow end, setting up a multiplicity of ultrasonic sources of resonance throughout the length and circumference of said stream and transmitting said resonance in radially inwardly converging directions toward and into the free flowing stream of said composite mass simultaneously and uniformly throughout the entire length and perimeter thereof, whereby to develop a condition of cavitation in the ultrasonic range while said composite mass is in transit, and then collecting the resulting combination of said composite mass at a discharge location.

2. A method of enhancing chemical activity in a continuous system comprising preparing a source of supply of a first predominately liquid mass and placing said first predominately liquid mass under a first selected rate of flow, preparing a source of supply of a second mass comprising a chemical agent and placing said second mass under a second rate of flow, adding the second mass to the first predominately liquid mass to form a predominately liquid composite mass, confining the composite mass to a passage of annular cross-sectional shape having hard and resilient outer and inner surfaces and providing an inlet adjacent one end and an outlet adjacent the other end, injecting said first predominately liquid mass through said inlet into the passage at said first selected rate of flow, introducing said second mass into said first predominately liquid mass at a location upstream of said inlet, thereby forming a free flowing stream of said composite mass through said passage, constantly sensing the total rate of flow of the composite mass in said passage, constantly sensing the rate of flow of the second mass downstream of said source of supply, bringing both said rates of flow into a counterbalancing relationship whereby to establish a supply flow rate for the second mass in proportion to the total rate of flow of the composite mass, maintaining the flow of said second mass into said first predominately liquid mass at said supply flow rate, setting up a multiplicity of ultrasonic sources of resonant energy throughout the length and circumference of said hard outer surface of the passage, projecting said resonant energy from said sources in radially converging directions relative to the composite mass while in said annular passage and transmitting said resonant energy condition to and into said composite mass throughout the entire space provided by the annular passage, continuing the transmitting of said energy to all portions of the composite mass as it progresses the length of the passage thereby creating a state of cavitation in the ultrasonic range within the composite mass for the duration of transit of said composite mass through said passage, and then collecting the product of said composite mass.

3. A method as in claim 1 including collecting the resulting combination of said composite mass in a reservoir, introducing a second chemical agent into said reservoir to form a second composite mass, agitating the second composite mass while in said reservoir and then discharging said second composite mass from the reservoir.

4. A method as in claim 3 including continuously passing a first portion of the second composite mass from the reservoir to the system and continuously discharging a second portion of the second composite mass from the reservoir while the first portion is being passed to the system.

5. A method as in claim 3 including returning the product of said second composite mass to said supply of the first predominately liquid mass whereby to form a mixture, and drawing off quantities of said mixture.

6. A method as in claim 1 including passing the predominately liquid mass through the system by gravity flow, introducing the chemical agent by gravity into the predominately liquid mass and metering the flow of said chemical agent in proportion to the flow of said predominately liquid mass to form the composite mass, passing the composite mass by gravity and in said condition of cavitation in the ultrasonic range to said discharge location.

7. A method as in claim 6 including adding to the predominately liquid mass a mixture of finely divided solids and a soluble ingredient and including the step of combining the chemical agent with the soluble ingredient, and subjecting the composite mass to said resonant condition while the combining is taking place, whereby the solids are separated from the composite mass, removing the soluble ingredient with the chemical agent in combined condition from the finely divided solids and then separating the chemical agent from the soluble material.

8. A method as in claim 7 including returning the chemical agent to the place of introduction after separating the chemical agent from the soluble material.

9. A method as in claim 6 including making up said composite mass from a finely divided mass of solid material and water wherein the resulting composite mass is in the form of a slurry, collecting said slurry in a reservoir for introduction of said chemical agent and metering the flow of the chemical agent into the reservoir in proportion to the flow of said composite mass with the chemical agent present from said reservoir.

* * * * *